Patented Apr. 19, 1932

1,854,180

UNITED STATES PATENT OFFICE

ROY CROSS, OF KANSAS CITY, MISSOURI, ASSIGNOR TO SILICA PRODUCTS CO., OF KANSAS CITY, MISSOURI, A CORPORATION OF DELAWARE

PROCESS FOR MAKING CONCRETE AND CEMENT MORTAR

No Drawing.    Application filed July 2, 1928. Serial No. 289,676.

This is an improvement in processes of making concrete and mortar. It is applied to all types of hydraulic cement, but particularly to what is known as Portland cement. Heretofore, it has been the general practice in making concrete and mortar to mix all ingredients together in a batch mix. It is practically never the practice to mix for a period of more than two or three minutes. It has been the general belief that if concrete is mixed with water it must be placed at the earliest possible moment to get the best results. It has been generally supposed that if this concrete is placed over a longer period than 30 minutes, it would be highly inferior and that if it were placed after the normal time for the initial set of the cement as determined by the usual means, the concrete would be ruined. This process is therefore, the outcome of the discovery that Portland cement may be mixed with water for a very long period of time greatly exceeding its "initial setting" time and even its "final setting" time without injury and that in practically all instances, there is a great improvement in the concrete or mortar.

As an illustration of this fact, a 1:2:4: mixture of concrete, in other words, concrete containing one part of cement, two parts of sand and four parts of crushed rock by volume and using 7.5 gallons of water per cubic foot of cement, showed a strength after hardening for 28 days, of from 2,500 pounds up to 4,200 pounds per square inch in terms of compression strength, the lower strength being obtained after two minutes mixing and the higher strength after seven hours of mixing. Intermediate strengths gradually increasing from two minutes up to seven hours were obtained and decreasing again after the seven hour period. After 24 hours of mixing, the concrete still gave a strength greater than the strength after two minutes mixing. It is obviously impracticable to continuously mix the sand, rock, water and cement for a period of seven hours however, and since the value of the longer period of exposure depends upon the action upon the Portland cement itself, the Portland cement is therefore subjected alone to the action of water and the same results in a general way were obtained. If the cement is hydrated to form a slurry and is then added to the aggregate, it gives the usual time strength of cement or mortar. If the slurry is mixed, for example, in the ratio of one part of the cement which it contains, to three parts of sand, then again, the maximum strength with the same cement above referred to was greatest at a period of seven hours. It is obvious that the time at which the maximum strength is obtained will vary according to the particular type of Portland cement used. In the case of so-called quickly hardening cement, this time is considerably less. It is also less in the case of finely ground cement. Many factors enter into the question as to exact strength obtained at different periods, but in general, it is found that the hydration of the cement for a long period of time greatly increases the strength of the concrete made from it.

In general, the premixing of the cement itself with water gives a superior result and a maximum strength at an earlier period than if all the materials were mixed simultaneously. Any period over five minutes shows a marked improvement. In the case of many cements or in many mixtures, it is necessary to use so much water that the slurry is very thin and the cement particles tend to separate. In such cases, which are quite common, it is necessary or desirable to use a thickening agent. Among the thickening agents which are used are diatomite or diatomaceous earth and bentonite or other hydrous silicate of alumina. Even Portland cement itself, or other calcium silicate may be treated with acid for use as a thickening agent. In some instances, Portland cement clinker may be treated with sulphuric acid in place of gypsum, thus greatly increasing the thickening action of the Portland cement. In a typical case, 5% by weight of sulphuric acid would be used. If bentonite is used, a typical quantity would be 2% of the weight of the cement. Another benefit of premixing the cement before adding the aggregate is the fact that the aggregate may be used in a drier condition than normally so that it will absorb part of the water from the slurry, causing a lower water-cement ratio next to the aggregate, thus increasing the strength of the concrete.

Instead of premixing the cement only, the concrete may also be premixed; or the sand and the cement alone may be mixed with the water. A typical and practical way in such cases is to compound all of the ingredients, including the cement, the sand, the rock, water, and any admixture that may be desired in the central mixing plant. This may be then dumped into a truck of any type. This truck may be an ordinary truck, one specially made for hauling concrete, or one with a screw conveyor for mixing and unloading which is used in some localities. The cement may be left in the truck for a period up to six or seven hours. In an ordinary instance it would be in the truck for a period of not over one-half hour, as this would be a typical time required for hauling it to the job where it is to be placed. When the concrete is dumped from the truck it is agitated enough to thoroughly break up any tendency for the concrete to become stiff; or, if the truck with the conveyor blades is used, the dumping by means of these conveyor blades is sufficient to thoroughly limber up the concrete. Of course if a satisfactory admixture is used to prevent segregation, the mere dumping from the truck is often sufficient. The same conditions also apply to the hauling of concrete more than ten or fifteen minutes after it has been premixed; but, particularly in connection with the use of admixtures such as gelatinizing clay and diatomaceous earth, it is possible to remix the concrete after many hours. Concrete has actually been remixed in this process after a period of 24 hours without destroying more than 25% of its setting power.

I claim as my invention:

1. A process of making concrete or mortar which comprises premixing Portland cement, an inorganic thickening agent and water for more than thirty minutes, and then intimately dispersing mineral aggregate into the premixture.

2. A process of making concrete or mortar which comprises premixing for a period of at least thirty minutes, Portland cement, bentonite and water and then intimately dispersing mineral aggregate into the premixture.

3. A process of increasing the strength of concrete which comprises premixing for a period of not less than thirty minutes and not to exceed seven hours, Portland cement and water and then intimately dispersing mineral aggregate into the premixture.

4. A process of making concrete which consists in treating finely divided Portland cement clinker with sulphuric acid then with water for a period greater than thirty minutes and then mixing the slurry resulting therefrom with aggregate to produce concrete.

ROY CROSS.